United States Patent [19]

Hunter

[11] 4,045,425

[45] Aug. 30, 1977

[54] CRYSTALLINE AZOPYRAZOLONE ACID DYE

[75] Inventor: Frank Ray Hunter, Newark, Del.

[73] Assignee: E. I. Du Pont de Nemours and Company, Wilmington, Del.

[21] Appl. No.: 659,512

[22] Filed: Feb. 19, 1976

[51] Int. Cl.$^2$ .............................................. C09B 43/00
[52] U.S. Cl. .................................. 260/163; 260/208; 260/707
[58] Field of Search ...................... 260/163, 208, 707

[56] References Cited

U.S. PATENT DOCUMENTS 3,563,685  2/1971  Speck ..................... 8/41 B

FOREIGN PATENT DOCUMENTS 563,332  9/1958  Canada .................... 260/163

Primary Examiner—Allen B. Curtis

[57] ABSTRACT

Crystalline, azopyrazolone acid dye and the preparation thereof, which dye is useful for dyeing textile materials using conventional, aqueous acid-dyeing techniques and is of the formula

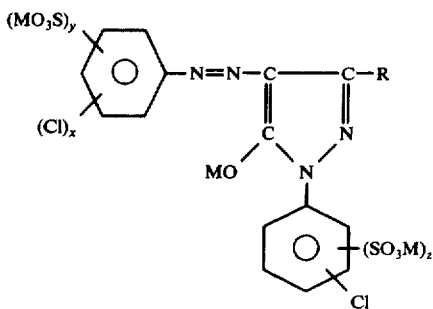

wherein R is H or $CH_3$, $x$ is 1 or 2, $y$ and $z$ are each 0 or 1, the sum of $y$ and $z$ is 1 and M is lithium, sodium or potassium cation, said crystalline dye being characterized by the absence of absorption in the 6.0 micron region of its infrared scan.

12 Claims, No Drawings

CRYSTALLINE AZOPYRAZOLONE ACID DYE

BACKGROUND OF THE INVENTION

1. Field of the Invention

This invention relates to a crystalline azopyrazolone acid dye having improved properties as compared to a similar azopyrazolone acid dye which is prepared by conventional prior art diazotization and coupling reactions.

2. Description of the Prior Art

Water-soluble azopyrazolone acid dyes are well known in the art and can be prepared by conventional diazotization and coupling reactions. Such dyes, after completion of the coupling reaction, carried out at a pH of, for example, 5–13, usually are isolated from the coupling reaction mix slurry by filtration, which step may be preceded by a salting out and/or acidification step. Representative of the prior art on the preparation of such dyes are U.S. Pat. Nos. 984,900; 3,563,685; and 3,575,957, British Pat. No. 966,677 and German Auslegeschrift No. 1,770,930. The German publication also discloses a method of improving the color stability of such a dye by heating the dye in an aqueous medium to about 50° C, the heat-treated dye being defined by lattice plane separations of 6.17, 3.33, 18.50 and 3.52 A as indicated by the strongest lines in the Debye-Scherrer X-ray diagram. Azopyrazolone acid dyes prepared by prior art processes may be contaminated with inorganic impurities, for example, with at least 5–10% of the salt used in the salting out step, and they may be difficult to filter because of their small particle size, for example, of the order of five microns or less. Moreover, the presence of the salt as an impurity may retard the dissolution of the dye in a subsequent dyeing operation.

DETAILED DESCRIPTION OF THE INVENTION

The invention herein resides in a crystalline, water-soluble, azopyrazolone acid dye which is more readily filterable, which is more readily dissolvable in water and which is of higher purity than the corresponding dye which is prepared by prior art techniques, and to the method of preparing the dye having such characteristics. The dye of this invention can be characterized by the formula

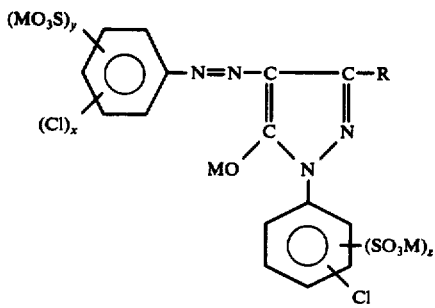

wherein R is H or CH$_3$, x is 1 or 2, each of y and z is 0 or 1, the sum of y and z is 1 and M is lithium, sodium or potassium cation. Exemplary of the dye of the invention are the dyes of the above formula and which are prepared from 3-sulfo-6-chloroaniline or 4-sulfo-2,5-dichloroaniline and 1-(4'-chlorophenyl)-3-methyl-5-pyrazolone. The crystalline dye of this invention is characterized by being, when subjected to infrared analysis, using a mineral oil dispersant, substantially free of absorption in the 6.0 micron region, indicative of the substantial absence of the carbonyl group in the pyrazolone moiety of the dye.

The dye of the invention is prepared by heating the precursor acid azopyrazolone dye which, in enolized form, is of the formula

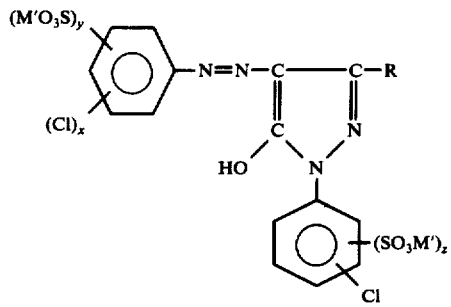

wherein R is H or CH$_3$, x is 1 or 2, each of y and z is 0 or 1, the sum of y and z is 1 and M' is a cation, said dye being characterized by absorption in the 6.0 micron region of its infrared scan (using a mineral oil dispersant), in an aqueous liquid medium, at a pH above 10.0, for example, at least 10.5, at a temperature of 35° C to the boiling point of the aqueous liquid medium, for example, 50°–60° C, in the presence of at least two equivalents of the cation M of the formula first appearing above per equivalent of dye, with 0–1 equivalent of the M cation being provided by M'. The necessary cation conveniently can be introduced into the liquid medium as part of the alkaline material which is used to adjust the pH to above 10.0. The heating and pH adjustment can be carried out simultaneously or in any order. Usually, better results are achieved by heating first and then raising the pH above 10.0. The appropriate precursor azopyrazolone dye which is used as the starting material in the aforesaid process can be such a dye which previously has been isolated after preparation by prior art diazotization and coupling techniques or it can be such a dye which is still present in the coupling reaction mix, that is, before isolation. If the latter, the simpler and more preferred method, the necessary heat can be applied and the pH of the mix then can be adjusted to above 10.0 to produce directly the dye of the invention. In determining how much appropriate cation must be present during the thermal treatment, that is, to ensure at least two equivalents per dye equivalent since the invention dye contains two M groups as shown in the formula first appearing above, consideration must be given to the possibility that the precursor dye already may be an —SO$_3$M salt wherein M is the necessary cation. If the aforesaid reaction conditions are met, the precursor dye will be converted into the dye of the invention and the latter generally will precipitate from the liquid medium in the form of large crystals. Occasionally, depending on the solubility of the desired dye and/or the concentration thereof in the treating medium, salting out may be required to recover the desired dye. The thermal treating at a pH of above 10.0 usually can be completed in thirty minutes or less. As is obvious from the above, the precursor dye, if not already in solution, must go into solution in the treating medium so that the desired dye can be formed and recovered, by precipitation, as large crystals.

The treating medium, although usually solely aqueous in nature for economic reasons, may be aqueous alcoholic, that is, a mixture of a water-soluble alcohol and water, for example, methanol and water. Aqueous alcoholic treating media containing up to 50 weight percent alcohol are useful herein.

As indicated above, the treating medium must contain the appropriate cation, conveniently introduced as part of the base which is employed to adjust the pH to above 10.0. Such bases include lithium hydroxide, sodium hydroxide and potassium hydroxide. Salts which may be employed in certain instances to salt out the desired dye include those commonly disclosed in the prior art to salt out dyes. Generally, such salt should be at least as soluble in the liquid medium, at the treating temperature, as the dye being salted out. The anions of such salts include the chloride, bromide, iodide, sulfate, nitrate and carboxylate, for example, formate, acetate and succinate, anions or, more generally, any anion which is inert to the dye under the treating conditions. Typical salts include lithium chloride, potassium carbonate, sodium formate, sodium acetate and sodium chloride, the latter generally preferred. When salting out is necessary, salt concentrations of up to 7-10 grams per 100 cc of treating medium are generally adequate.

The dye of the invention, in the form of crystals 8-100, typically 50-100, microns long, is readily distinguishable from the precursor dye, generally amorphous, which generally is isolated from the coupling reaction mix by known prior art processes and whose particle size dimensions are typically of the order of five microns or less. As already indicated, the dye of the invention can be recovered in purer form, with less salt contamination, than the conventionally recovered precursor dye and, further, it is more readily dissolvable in water than such precursor dye. Although the precursor dye, when analyzed by infrared techniques, using a mineral oil dispersant, exhibits carbonyl absorption in the 6.0 micron region, the dye of the invention is substantially free of such absorption. It has been discovered that the dye of the invention, when subjected to an acid treatment, for example, in an aqueous medium at a pH of 5.5 or less, at ambient temperature, can be converted back to the conventional prior art form by a procedure which appears to involve dissolution and reprecipitation. The reprecipitation form of the dye exhibits substantially the same infrared scan, that is, a peak in the 6.0 micron region, as the dye originally prepared by conventional diazotization and coupling techniques. The utility of the invention acid dye is comparable to that of the precursor acid dye, for example, the dyeing of textiles, such as nylon fibers, using conventional aqueous acid-dyeing procedures.

The following examples are illustrative of the invention dye and its preparation.

EXAMPLE 1

Twenty-five grams of the isolated, crude azopyrazolone dye which was prepared, using prior art procedures, by coupling diazotized 3-sulfo-6-chloroaniline to 1-(4'-chlorophenyl)-3-methyl-5-pyrazolone were stirred in a solution consisting of 125 ml of water, 42 ml of methanol and 12 grams of sodium chloride. The mixture was heated to 50° C and 30% aqueous sodium hydroxide was added until the pH rose above 10.0. The dye appeared to dissolve and then began crystallizing out as large needles, as viewed under a microscope. Complete transformation to needles occurred in about 30 minutes.

The needles were filtered off; filtration was very rapid, in sharp contrast to the usual slow filtration of this dye in its conventional form. The dye was used to dye, using prior art procedures, nylon fabric; it gave about the same shade as the conventionally prepared dye at low strength dyeings but noticeably greener and brighter shades at the 4% strength level. An infrared scan of the dye, using a mineral oil ("Nujol") dispersant, was substantially free of absorption in the 6.0 micron region. The dye was of the formula

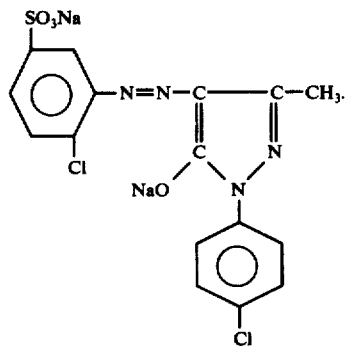

Analysis, Calculated for $C_{16}H_{10}N_4Cl_2SO_4Na_2.2H_2O$ (2.8% NaCl): C, 36.8; H, 2.7; N, 10.7; S, 6.1; Cl (total), 13.8; $H_2O$, 6.9%. Found: C, 36.6; H, 2.8; N, 10.6; S, 6.2; Cl (total), 14.4; $H_2O$, 6.6; NaCl, 2.8%.

EXAMPLE 2

To the aqueous coupling reaction mix of the same dye as in Example 1 (that is, the unisolated dye), containing about 12 weight percent of dye, methanol (7 weight percent) was added. It was then alkalized at 25° C by adding 50% aqueous sodium hydroxide until the pH was 10.0. The temperature was then raised to 50° C but no dye crystals appeared to form. Additional 50% aqueous sodium hydroxide was added until the pH increased to 10.3-10.5, whereupon large needles formed and became the sole dispersed solids. A portion of the slurry was diluted with water and heated to 90° C, at which temperature dissolution took place. The large crystals reappeared when the solution was cooled to 80° C. The infrared scan of these crystals, using a mineral oil ("Nujol") dispersant, showed no 6.0 micron peak. The main slurry was filtered and a portion of the recovered needles was dissolved in water and the pH was adjusted to 3 with hydrochloric acid. Almost immediately a solid precipitated; it was filtered off and dried. The infrared scan of this dried solid resembled the scan of the conventional form of this dye, including the peak at 6.0 microns.

EXAMPLE 3

The aqueous coupling reaction mix of the same dye as in Example 1 (that is, the unisolated dye) was divided into two parts. Methanol (0.06 ml/ml of mix) was added to one part and a like volume of water was added to the other part. After heating each to 50° C, aqueous sodium hydroxide was added to each to increase the pH to 10.7. The expected invention dye crystals formed in each; however, as noted by visual observation, the crystals were larger in the part to which methanol had been added.

EXAMPLE 4

An alkaline reaction mass containing about 10% dye and obtained, using conventional procedures, by coupling diazotized 4-sulfo-2,5-dichloroaniline to 1-(4'-chlorophenyl)-3-methyl-5-pyrazolone was heated to 60° C and salted to 2.5% with sodium chloride. When 50% aqueous sodium hydroxide was added to raise the pH to at least 10,5, dye transformation to needle-like crystals occurred. The filtration rate of the product was much faster than the filtration rate of this dye in the conventional form, that is, when it was isolated from the aforesaid alkaline reaction mass in the conventional manner. The precursor dye exhibited a peak at 6.0 microns in the infrared scan; the infrared scan of the recovered invention dye was free of this peak. The invention dye was of the formula

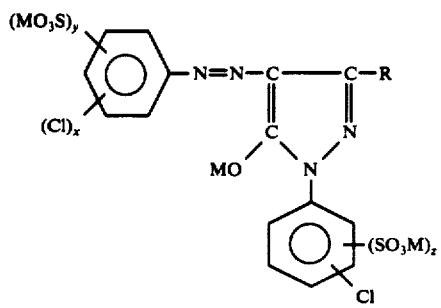

I claim:

1. Crystalline, azopyrazolone acid dye of the formula

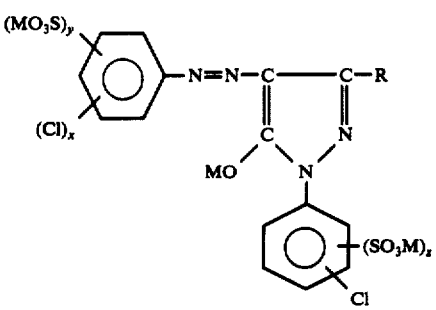

wherein R is H or $CH_3$, x is 1 or 2, y and z are each 0 or 1, the sum of y and z is 1 and M is ammonium, lithium, sodium or potassium cation, said crystalline dye being characterized by the absence of absorption in the 6.0 micron region of its infrared scan.

2. Dye of claim 1 of the formula

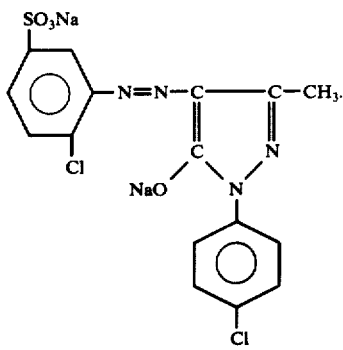

3. Dye of claim 1 of the formula

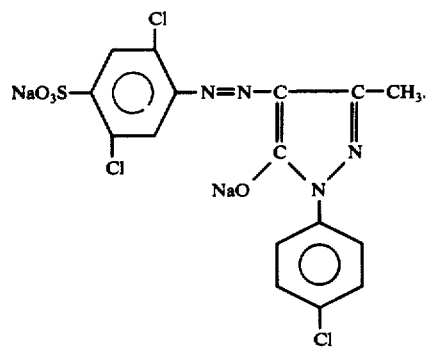

4. Process for preparing the crystalline, azopyrazolone acid dye of the formula

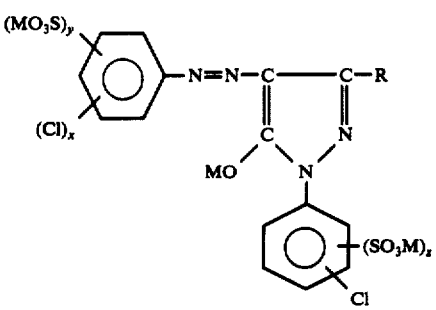

wherein R is H or $CH_3$, x is 1 or 2, y and z are each 0 or 1, the sum of y and z is 1 and M is ammonium, lithium, sodium or potassium cation, said crystalline dye being characterized by the absence of absorption in the 6.0 micron region of its infrared scan, which process consists of heating the dye which, in enol form, is of the formula

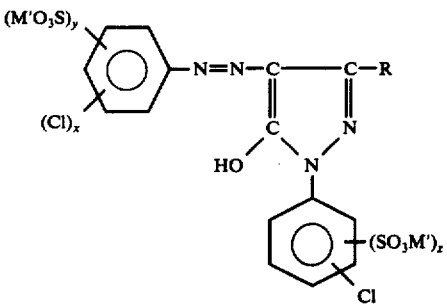

wherein R, x, y and z are as defined above and M' is a cation, said dye being characterized by absorption in the 6.0 micron region of its infrared scan (using a mineral oil dispersant), in an aqueous liquid medium, at a pH above 10.0, at a temperature of 35° C to the boiling point of the aqueous liquid medium, in the presence of at least two equivalents of the cation M per equivalent of dye, with 0–1 equivalent of M being provided by M'.

5. Process of claim 4 wherein the pH is at least 10.5 and the temperature is 50°–60° C.

6. Process of claim 4 wherein M is Na cation.

7. Process of claim 4 wherein the aqueous liquid medium contains up to 10 grams per 100 cc of medium of a salting out agent.

8. Process of claim 7 wherein the agent is sodium chloride.

9. Process of claim 4 wherein the aqueous liquid medium contains up to 50 weight percent of a water-soluble alcohol.

10. Process of claim 9 wherein the alcohol is methanol.

11. Process of claim 4 wherein the dye being prepared is of the formula

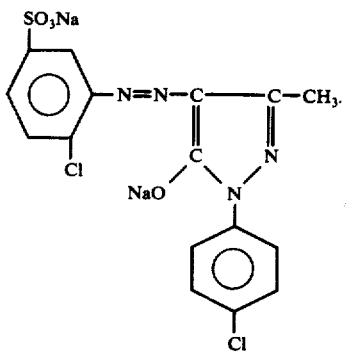

12. Process of claim 4 wherein the dye being prepared is of the formula

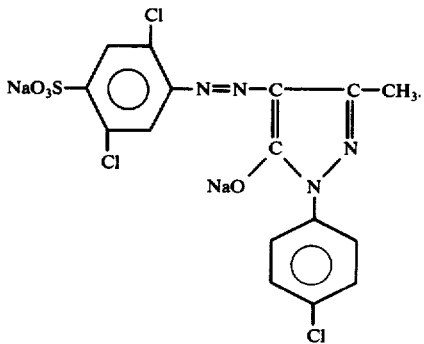

* * * * *